July 7, 1953  H. S. BLOCH ET AL  2,644,847
PROCESS AND PRODUCT OF PRODUCING HYDROCARBON DRYING OILS
Filed Sept. 29, 1948  2 Sheets-Sheet 1

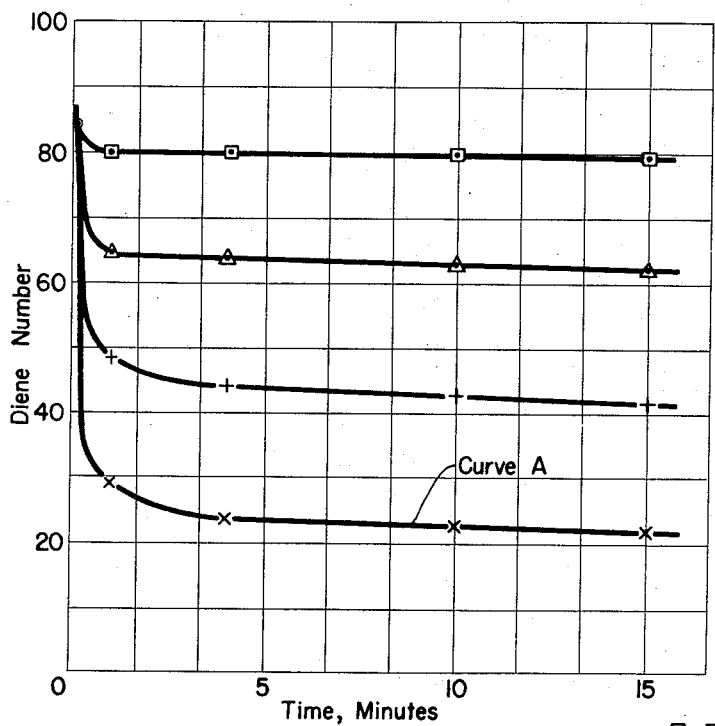

FIG. 1.

Effect of Contact Time of HF on the Diene Number of Polyolefinic Cyclic Hydrocarbons at 122° C.

LEGEND

—□—□—
Sludge containing 0.1 % HF
—△—△—
Sludge containing 0.56% HF
—+—+—
Sludge containing 2.54% HF
—×—×—
Sludge containing 12.4 % HF

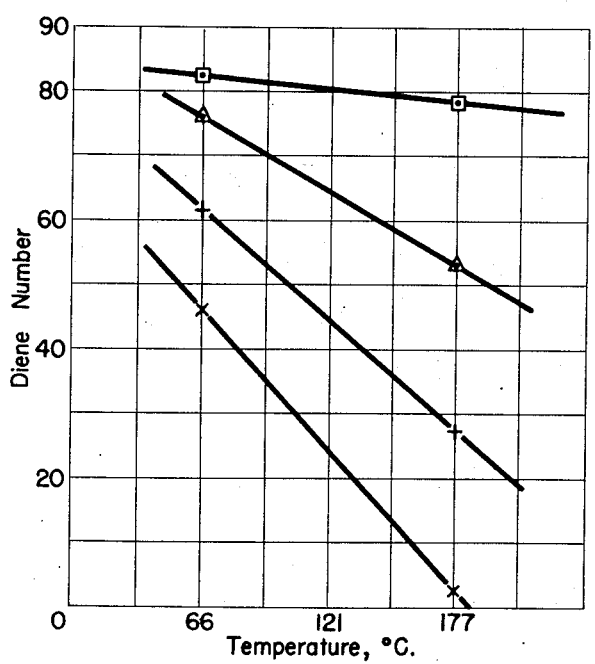

FIG. 3.

Temperature vs. Diene Number of Polyolefinic Cyclic Hydrocarbons in Contact with HF INVENTORS:
Herman S. Bloch
Alfred E. Hoffman
By: Maynard P. Venema
Chester J. Giuliani
Attorneys

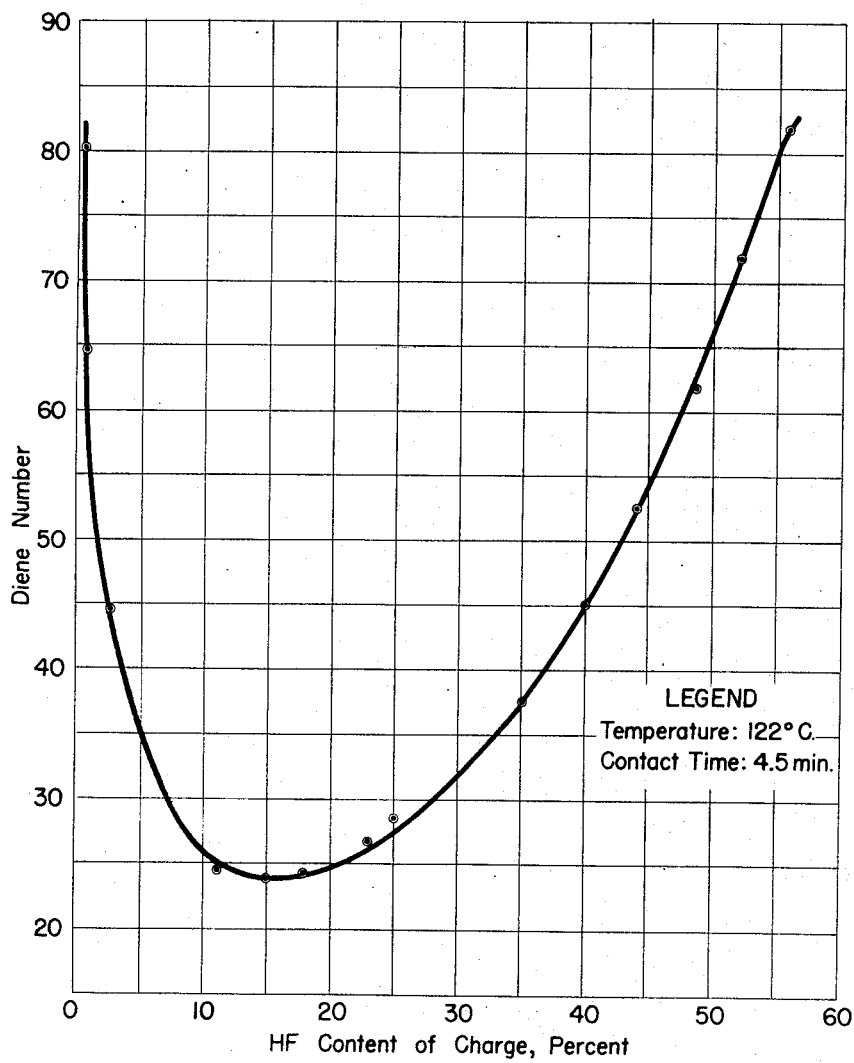

Patented July 7, 1953

2,644,847

UNITED STATES PATENT OFFICE 2,644,847

PROCESS AND PRODUCT OF PRODUCING HYDROCARBON DRYING OILS

Herman S. Bloch, Chicago, and Alfred E. Hoffman, Clarendon Hills, Ill., assignors to Universal Oil Products Company, Chicago, Ill., a corporation of Delaware Application September 29, 1948, Serial No. 51,814

7 Claims. (Cl. 260—666)

This invention relates to a process for improving the properties and particularly the drying characteristics of hydrocarbon drying oils of the type comprising high molecular weight cyclic hydrocarbons containing multiple unsaturated double bonds of which a limited proportion are in conjugated relationship. More specifically, the invention concerns a method of producing so-called conjunct hydrocarbon polymers for drying oil purposes by means of a process whereby the conjugation of the olefinic double bonds in said conjunct polymers may be accurately controlled to produce a hydrocarbon product having the most desirable number of said conjugated double bonds for the indicated drying oil purposes.

The principal object of this invention is to provide a process for reducing the degree of conjugation in the olefinic double bonds of the polyolefinic cyclic hydrocarbons recovered from a sludge formed in a conjunct polymerization process, although retaining the total number of said olefinic double bonds. Another object of the invention is to improve the "drying" properties of a mixture of polyolefinic cyclic hydrocarbons recovered from a sludge formed in a conjunct polymerization reaction by eliminating the tendency of said hydrocarbons to form brittle, friable, protective coatings upon exposure of a thin film of the hydrocarbons to atmospheric oxygen. Still another object of the invention is to provide a process for the production of a hydrocarbon drying oil consisting of a mixture of polyolefinic, cyclic hydrocarbons having a high bromine number, that is, a large total number of olefinic double bonds, and a few or intermediate number of conjugated olefinic linkages.

One method of improving the drying characteristics of a hydrocarbon drying oil of the type comprising a mixture of polyolefinic cyclic hydrocarbons or unsaturated conjunct polymers comprises reacting an unsaturated non-aromatic hydrocarbon containing at least 3 carbon atoms per molecule with a conjunct polymerization catalyst whereby said polyolefinic cyclic hydrocarbons are formed during the reaction and combine with said conjunct polymerization catalyst in a definite molar proportion of catalyst per double bond of the polyolefinic cyclic hydrocarbons forming thereby a sludge containing catalyst-hydrocarbon complex addition products, recovering said polyolefinic cyclic hydrocarbons from said sludge by decomposing said complex addition products contained in said sludge, thereafter contacting said recovered polyolefinic cyclic hydrocarbons with said catalyst in such proportions that the mixture contains less than the said molar proportion of catalyst per double bond in the structure of said polyolefinic cyclic hydrocarbon product, continuing the period of contact for a time and at such temperature and pressure conditions that isomerizaton of the double bonds in said polyolefinic cyclic hydrocarbons to a non-conjugated arrangement takes place and recovering the resulting isomerized polyolefinic cyclic hydrocarbons from said catalyst. The combining proportion of catalyst with the cyclic polyenes which we have found to occur during conjunct polymerization reactions, in mols of catalyst per double bond, are: hydrogen fluoride, 6; sulfuric acid, 3; aluminum chloride, 1; and aluminum chloride in the presence of hydrogen chloride, 1 of each.

Another embodiment of the present invention relates to a process for improving the drying characteristics of a hydrocarbon drying oil of the type comprising a mixture of polyolefinic cyclic hydrocarbons recovered from a hydrogen fluoride sludge formed in a conjunct polymerization process which comprises thermally decomposing said hydrogen fluoride sludge in the presence of a saturated hydrocarbon diluent maintained at a temperature sufficient to effect thermal dissociation of the hydrogen fluoride-polyolefinic cyclic hydrocarbon complex addition compounds in said sludge and to dissolve the liberated conjunct hydrocarbon polymers, thereafter fractionally distilling the hydrocarbon phase recovered from said sludge to separate therefrom said polyolefinic cyclic hydrocarbons, admixing said hydrocarbons with fresh hydrogen fluoride sludge, heating the mixture for a time and at such temperature and pressure conditions that isomerization of the double bonds in said polyolefinic, cyclic hydrocarbons to a relatively non-conjugated arrangement takes place and subjecting the resulting mixture to thermal decomposition in the presence of said saturated hydrocarbon diluent to recover from the resulting sludge a mixture of conjunct polymers having an intermediate number of conjugated double bonds and improved air-drying properties.

In accordance with still another embodiment of the present invention, a hydrogen fluoride sludge is subjected to a process which embodies decomposing it in the presence of a solid decomposition catalyst such as, for example, copper, at a temperature sufficient to liberate hydrogen fluoride and polyolefinic cyclic hydrocarbons from said sludge and vaporize said liberated hydrogen fluoride while maintaining sufficient reflux of said hydrogen fluoride vapor to cause at least a portion of said hydrogen fluoride to return to the sludge decomposition zone and admix therein with said polyolefinic cyclic hydrocarbons, regulating the proportion of hydrogen fluoride and the temperature of said mixture sufficient to isomerize the unsaturated double bonds in said polyolefinic cyclic hydrocarbons whereby the proportion of non-conjugated double bonds is greater than was present in the mixture of polyolefinic cyclic hydrocarbons subjected to isomerization, and withdrawing the liquid hydrocarbon phase from said decomposition zone to recover therefrom the isomerized polyolefinic cyclic hydrocarbons.

The art relating to hydrocarbon conversion processes has heretofore recognized that certain types of hydrocarbons of unsaturated non-aromatic structure when reacted with particular inorganic catalysts at selected reaction conditions undergo a type of reaction known in the art as a conjunct polymerization process to form a sludge-type product containing a major proportion of the catalyst charged to the reaction in addition to a saturated hydrocarbon product, and that the sludge may be treated to recover therefrom a mixture of polyolefinic cyclic hydrocarbons or so-called "conjunct polymers." The latter mixture of hydrocarbons recovered from the sludge as hereinafter described is found to comprise highly unsaturated hydrocarbons of high molecular weight and of generally monocyclic and polycyclic, non-aromatic structure in which the unsaturation is both of the conjugated and non-conjugated variety. The unsaturated conjunct polymers are known to possess the ability to undergo the so-called "drying" process when contacted as a thin film with atmospheric oxygen. The mechanism of the drying reaction is believed to be a combination polymerization-oxidation reaction forming a film having a hard, normally non-tacky surface similar to the film obtained from "drying" an unsaturated fatty acid glyceride drying oil of vegetable, animal, or marine origin. The conjunct polymers or polyolefinic cyclic hydrocarbons as recovered from a sludge formed in a conjunct polymerization reaction contain from about 2.5 to about 4 double bonds per molecule of which an average of from about 1.5 to about 2.5 belong to a conjugated dienic system, the remaining olefinic linkages being distributed throughout the hydrocarbon chain in isolated positions. Although unsaturation in the structure of these hydrocarbons is apparently essential to their ability to dry and some conjugation in the arrangement of double bonds is desirable to produce a drying oil having a reasonable rate of drying, the high degree of conjugation in the unmodified conjunct polymers as recovered from the sludge is believed to be responsible for the brittleness characteristic of dried or air-exposed films of the latter hydrocarbon drying oils. Among the natural glyceride drying oils, tung oil likewise contains a high degree of conjugated unsaturation and the undesirable gelling characteristic as well as the tendency of these oils to yellow on aging are believed to be the effect of the highly conjugated unsaturation in the fatty acid portion of the glyceride esters comprising the latter oils. The present invention is concerned with a process for reducing the number of conjugated olefinic double bonds in hydrocarbon drying oils of the type comprising a mixture of polyolefinic cyclic hydrocarbons formed in a conjunct polymerization reaction to thereby reduce or eliminate the brittleness characteristic of said hydrocarbon oils. Although the method herein provided reduces the number of conjugated double bonds within the structure of these hydrocarbons, it does not reduce the total unsaturation of such hydrocarbons and therefore does not impair the ability of the oil to form completely dry or tack-free films on exposure to atmospheric oxygen. The process mechanism believed to be responsible for the improved results herein obtained with polyolefinic cyclic hydrocarbons is essentially an isomerization of the double bonds contained in the individual hydrocarbons from the conjugated to the non-conjugated arrangement thereof and does not involve a reduction in the total number of double bonds via polymerization. Thus, although the diene number (the standard method of measuring conjugated unsaturation) of the recovered mixture of polyolefinic cyclic hydrocarbons is lower than the charging stock utilized in the process, the bromine number (a measure of total olefinic unsaturation) nevertheless is equal to or may even be slightly higher than that of the polyolefinic cyclic hydrocarbons subjected to the present conversion.

The hydrocarbon product of the present process having a medium or low diene value and high total unsaturation is to be distinguished from the product of the prior art having not only low conjugated unsaturation but low total unsaturation or bromine numbers as well. Although hydrocarbons having few conjugated double bonds have been previously prepared by means of a conjunct polymerization reaction, the products are nevertheless of essentially different structure; although of high molecular weight, their total unsaturation is generally less than half the present product and they are prepared under such conditions of temperature, pressure and reaction time that true cross polymerization of the conjunct polymers takes place forming highly aromatic resinous, tarry or other high molecular weight condensation products as compared to the normally light-colored, highly unsaturated hydrocarbons of intermediate molecular weight and diene value formed by means of the present process.

In preparing the present medium diene value drying oil hydrocarbons a primary sludge is formed by reacting a hydrocarbon charging stock capable of undergoing conjunct polymerization, generally an unsaturated, non-aromatic hydrocarbon or an isoparaffin, with certain optimum proporotions of a conjunct polymerization catalyst at reaction conditions hereinafter specified. The properties of the ultimately recovered polyolefinic cyclic hydrocarbons or conjunct polymers depend to some extent upon the type of hydrocarbons employed in the sludge-forming or conjunct polymerization reaction. Suitable hydrocarbon starting materials comprise, in general, unsaturated hydrocarbons containing at least 3 carbon atoms per molecule such as monoolefins, polyolefins and/or acetylenic hydrocarbons of either branched or straight chain structure. Cyclic olefins and isoparaffins may also be employed as charging stocks to the primary conjunct polymerization reaction, either individually or in admixture with, for example, mono- or polyolefins. When utilized as the major component of the charging stock, propylene is desirably admixed with higher molecular weight hydrocarbons and a larger ratio of catalyst to hydrocarbons is charged to the sludge-forming or conjunct polymerization reaction. A mixture of the various classes of hydrocarbons specified above may be utilized in preparation of the sludge, the proportion of aromatic hydrocarbons in the mixture desirably being small or preferably nil, since the latter hydrocarbons tend to reduce the yield of the sludge. An especially preferred charging stock from the standpoint of general availability and desirability in producing a sludge in high yields is the hexene to dodecene fraction or an octene fraction of a selective or non-selective polymer gasoline (prepared by the copolymerization of various butylenes and/or propylene). Other suitable hydrocarbon charging stocks in the preparation of the present conjunct polymer hydrocarbon product are the various fractions of thermally cracked gasoline which have been reduced in aromatic content, for example, by extraction, to render the same useful as charging stock in the present process.

The inorganic conjunct polymerization catalysts which when contacted with the hydrocarbon charging stock of the above specifications yield a sludge containing complex addition products of the catalyst with the unsaturated conjunct polymers formed in the reaction are generally characterized as acid-acting catalysts and are generally charged to the conjunct polymerization reaction as anhydrous materials. The catalysts utilizable in the present process include certain members of the anhydrous Friedel-Crafts metal halide group and certain inorganic acids. Thus, anhydrous aluminum chloride and aluminum bromide, either individually or in the presence of a promoter comprising hydrogen chloride or hydrogen bromide are capable of effecting conjunct polymerization of the unsaturated hydrocarbon charging stock. Of the inorganic mineral acids utilizable as catalysts, sulfuric acid having a concentration usually above about 85%, and preferably from about 95 to about 100% concentration and hydrofluoric acid containing less than about 10% of water (preferably the substantially anhydrous reagent) comprise another group of the generally broad class of acid-acting catalysts utilizable to effect conjunct polymerization. Borontrifluoride in admixture with hydrogen fluoride or hydrofluoric acid, preferably mixtures containing at least about 10% hydrogen fluoride, may likewise be utilized in the present process as catalyst. Recycled hydrogen fluoride obtained by thermal or catalytic decomposition of a hydrogen fluoride sludge as hereinafter described with reference to one method of recovering the conjunct polymers may be employed as catalyst, since decomposition of the hydrogen fluoride sludge may be effected under such conditions that the recovered hydrogen fluoride is from about 98 to 100 per cent purity.

On contacting the hydrocarbon charging stock and conjunct polymerization catalyst at reaction conditions specified, generally, as "sludge-forming" or "conjunct polymerization" reaction conditions, the catalyst in the initial stages of the reaction acts catalytically in effecting polymerization, cyclization, and hydrogen transfer between the charged hydrocarbon reactants to form high molecular weight, cyclic hydrocarbon compounds, some of which are saturated and some polyunsaturated. The polyunsaturated hydrocarbons combine with the catalyst in definite molecular proportions to form a catalyst-polyolefinic hydrocarbon addition complex comprising the sludge. The latter is a relatively non-viscous liquid product of the reaction containing definite chemical compounds of the addition complex type but containing substantially no compounds having organically bound anionic catalyst groups such as fluorine, chlorine, or sulfate radicals. The net result of the combined hydrogen transfer, polymerization and cyclization reactions, (which, in effect, occur substantially as a simultaneous combination reaction referred to in the aggregate as a conjunct polymerization reaction) is the production of the polyolefinic cyclic hydrocarbons appearing in combination with the catalyst as the sludge. As a further result of the hydrogen transfer reactions occurring during conjunct polymerization, a portion of the hydrocarbon components of the reaction mixture becomes saturated to form a distinct phase in the mixture which separates from the sludge as an upper hydrocarbon layer readily separated from the lower sludge layer and which generally comprises both open-chain and cyclic saturated hydrocarbons.

The sludge-forming stage of the present process or the primary conjunct polymerization reaction is effected by contacting the hydrocarbon starting material of the aforementioned composition, preferably an olefinic charging stock composed of olefins having at least 3 carbon atoms per molecule with the conjunct polymerization catalyst at a temperature within the range of from about 0° C. to about 200° C., preferably from about 30° to about 125° C. and at a superatmospheric pressure sufficient to maintain the reactants in substantially liquid phase. If the charging stock is isoparaffinic rather than olefinic, the higher temperatures in the ranges cited are required. The temperature conditions for each of the above classes of conjunct polymerization catalysts may vary depending upon the characteristics of the catalyst. For example, temperatures in the lower range of the above limits are utilized when sulfuric acid is employed as catalyst because of the oxidizing tendency of sulfuric acid at temperatures above about 150° C., the preferred reaction temperature for sulfuric acid being within the range of from about 0° to about 125° C. Observation has shown that substantially anhydrous hydrofluoric acid having a concentration greater than about 95% is the preferred conjunct polymerization catalyst, not only on the basis of superior yields and quality of the hydrocarbon product recovered from the sludge, but also from the standpoint of certain operating advantages, especially in the sludge decomposition stage where thermal methods of decomposition may be employed, making it possible to recover, for recycling purposes, a hydrogen fluoride effluent phase containing from about 98 to 100 per cent anhydrous hydrogen fluoride. An optimum yield of sludge is obtained, which, when decomposed in accordance with the methods herein provided yields a drying oil having a maximum degree of unsaturation for the particular charging stock utilized, when the weight ratio of olefins to conjunct polymerization catalyst charged to the reaction zone is maintained within the range of from about 1.2 to about 3.5, preferably from about 1.7 to about 2.5.

At the above reaction conditions and when the reaction mixture of hydrocarbons and catalyst is mixed by some form of stirring device, sludge formation takes place very quickly, although the reaction may be allowed to continue for one or more hours to obtain peak production of the sludge or to cause diminution of unsaturation in the ultimately recovered "upper layer" hydrocarbons. The liquid catalyst phase and the upper layer saturated hydrocarbon phase, formed upon completion of the reaction, separate on standing, and the separate phases may be recovered by decantation.

The conjunct polymers or polyolefinic cyclic hydrocarbon drying oil mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated product but reduces the concentration of the recovered catalyst phase to the point that it cannot be economically recovered for recycling purposes to the sludge-forming stage. This method consists of hydrolyzing the sludge with water or a dilute alkali solution. During the hydrolysis, the unsaturated conjunct polymer hydrocarbons, released from the sludge, form a separate phase and rise to the top of the mixture, while the water-soluble or water-hydrolyzable catalyst enters the aqueous phase. In the case of the aluminum halides, the aqueous treatment hydrolyzes the catalyst chemically so that even by evaporation of the water, the original anhydrous aluminum halide cannot be recovered as such. In the case of sulfuric acid and hydrogen fluoride, the water merely hydrolyzes the catalyst-conjunct polymer complex and the anhydrous catalyst may be recovered from the aqueous phase by removing the water therefrom directly or by a series of indirect steps. The hydrolytic method, however, entails certain disadvantages; attending the high cost of the recovery procedure for reconcentrating the acid, for example, these methods also require the use of acid-resistant equipment, not only in the aqueous hydrolysis step but also in the distillation equipment for concentrating the aqueous acid and for converting the concentrate to anhydrous acid.

The aqueous hydrolytic method of recovering the conjunct hydrocarbon polymers from the sludge must of necessity be utilized when relatively non-volatile conjunct polymerization catalysts such as the aluminum halides or sulfuric acid are employed in the formation of the sludge and may optionally be utilized to effect hydrolysis of the sludge formed when hydrogen fluoride is employed in the formation of the sludge. In order to prepare the medium diene value conjunct polymers of the present invention when the hydrolytic method of sludge decomposition is employed, the isomerization of the conjunct polymer hydrocarbons may either be effected during the sludge forming stage of the process, or it may be accomplished following the recovery of the conjunct polymers from the sludge in a separate step. Both methods involve reaction of the cyclic polyenic conjunct polyenes with less than the theoretical quantity of conjunct polymerization catalyst required to form catalyst-hydrocarbon complexes. In the first case, this is effected by recycling recovered polyenes to the conjunct polymerization reaction, and in the alternative method, the polyenes are separately treated with regulated amounts of catalyst, as hereinafter described. The conversion conditions and catalyst utilized in the secondary reaction may be the same or different than the same factors employed in the primary sludge-forming reaction. Thus, a mixture of polyolefinic cyclic hydrocarbons having a diene value of from about 80 to about 90, recovered from a hydrogen fluoride primary sludge, for example, by hydrolyzing said sludge, may be contacted in a secondary reaction stage with a quantity of conjunct polymerization catalyst less than the amount required to form complete complexes with said hydrocarbons such as hydrogen fluoride, an aluminum halide or sulfuric acid and reacted therewith at the original reaction temperature or at other temperatures for a predetermined, controlled period of time to form a sludge from which the medium diene value hydrocarbons or conjunct polymers of this invention may be recovered.

The reduction in diene value of a mixture of polyolefinic cyclic hydrocarbons is the result of several mutually operative factors, including temperature, time of contact between the conjunct polymerization catalyst and hydrocarbon charging stock, and the quantity of catalyst in the reaction mixture. The effect of these variables on the diene value of the ultimate product is shown in the accompanying diagrams and form the basis of the present method of operation.

The effect of time or the period of contact between catalyst and hydrocarbon charging stock on the degree of conjugated unsaturation in the ultimately recovered product is shown in Figure I of the accompanying diagram. Thus, at a temperature of 122° C., the diene value of the recovered polyolefinic hydrocarbons falls off rapidly as the time of contact or the reaction period is increased, and the effect is noted for any concentration of hydrogen fluoride less than the equivalent amount, although the effect is more pronounced when the quantity (weight percentage) of hydrogen fluoride in the sludge is in the range of 10 to 20 per cent (e. g. in Figure I, 12.4% as compared to 0.1% HF). Thus, to produce a drying oil consisting of unsaturated conjunct polymers having a diene value of from about 20 to about 40, a mixture of said conjunct polymers and hydrogen fluoride containing 12.4% of the latter component by weight need be heated at 122° C. for only one minute to obtain the desired reduction in diene value. For other conditions of operation, the corresponding time requirement is indicated in Figure I. The operation of the present process for reducing the diene value of conjunct polymers to medium diene numbers may be based entirely upon the factor of time, although for low concentrations of hydrogen fluoride in the mixture (e. g. see curve A for 0.1% HF) the time required may be impracticably long, since the greatest proportional reduction in diene value is produced during the first one minute of contact.

The effect of the quantity of conjunct polymerization catalyst on the diene value of polyolefinic cyclic hydrocarbons is shown in Figure II of the accompanying diagram for a contact period of 4.5 minutes. Although the data presented therein is for hydrogen fluoride and for a particular period of contact, similar results are obtained for other conjunct polymerization catalysts, such as aluminum chloride or sulfuric acid and for longer and shorter contact periods. With the temperature variable constant, the reduction in diene value or conjugated unsaturation of the polyolefinic cyclic sludge hydrocarbons is very pronounced, the curve dropping precipitously as the concentration of hydrogen fluoride increases. Thus, over the range of hydrogen fluoride concentration of from 0.1 to 1.0, the diene value drops from 80 to 60 within 0.5 minute. The method of operating the present process by admixing a specified quantity of catalyst, less than the amount required to form complete catalyst-hydrocarbon complexes, with the polyolefinic cyclic hydrocarbons containing conjugated unsaturation recovered from a primary sludge (6 mols of catalyst per double bond of said hydrocarbons) and heating the mixture for a time such that the desired degree of diene number reduction is obtained, provides the most convenient means of obtaining the ultimate medium diene value drying oils herein desired.

The factor of reaction temperature at which the hydrocarbons and catalyst are contacted is another operating variable which enables the diene number to be controlled at will, when other factors are taken into consideration. Figure III of the accompanying diagram illustrates graphically the pronounced effect of temperature during the conversion, and the relationship of HF concentration and temperature with the diene value. In order to form a product having a diene value of 30, for example (one of the preferred intermediate diene values for drying oil purposes), the mixture of conjunct polymers may be heated in the presence of 12.4% by weight of conjunct polymerization catalyst at approximately 100° C. for 4.5 minutes to reduce the diene number from an initial 80 to the desired 30. Other combinations of these factors in relation to the temperature may be obviously selected from the data presented in Figure III to provide a process of controlled operation.

The ability to readily recover the conjunct polymerization catalyst in a nearly anhydrous state by means of an inexpensive procedure and the ease of effecting the present reduction of diene value in the recovered conjunct polymer product thereof constitutes one of the chief advantages in the use of hydrogen fluoride as conjunct polymerization catalyst, since hydrogen fluoride may be vaporized from the sludge, cooled and reliquefied for recycling purposes and its reflux rate may be accurately controlled to produce the desired degree of conversion. The decomposition of the HF-hydrocarbon complexes in the sludge may be effected by merely heating the sludge until the hydrogen fluoride component thereof is removed by vaporization, leaving a hydrocarbonaceous residue in which the component hydrocarbons contain more or less unsaturation, depending upon the reflux rate and the distillation temperature and pressure conditions. The latter simple thermal decomposition method, however, as may be expected from the known catalytic activity of free anhydrous hydrogen fluoride, yields an inferior hydrocarbon product containing few, if any, olefinic bonds desired in the product for use as a drying oil. The hydrocarbon product resulting from the simple thermal decomposition process usually contains few unsaturated bonds of either the conjugated or non-conjugated type due to inter-polymerization and condensation of the unsaturated hydrocarbons; a large proportion of the product, in fact, may consist of tarry or highly colored condensation products. The simple thermal decomposition method of treating the sludge, however, may be modified in accordance with the present process to obviate many of these disadvantages. Such modified procedures involve decomposing the sludge in the presence of a sludge decomposition catalyst or in the presence of an inert diluent which dissolves the liberated sludge hydrocarbons immediately upon decomposition and removes them immediately from contact with the free hydrogen fluoride likewise liberated from the sludge. In the catalytic decomposition method the hydrogen fluoride sludge at a temperature of from about 50° to about 250° C. is charged into a reactor column packed with a catalytic material which enhances the decomposition of the sludge but retards the cracking and polymerization of the conjunct polymers released from the sludge. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, and certain forms of carbon and metallic fluoride or oxyfluoride salts. Among the preferred catalysts for effecting the decomposition, copper and cobalt as well as certain brasses containing copper, lead and tin have been found to be some of the most effective.

In the thermal decomposition method involving introduction of the hydrogen fluoride sludge into a liquid pool of inert diluent, the temperature of the diluent is maintained sufficiently high so that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product to insure relatively slight vaporization or "flashing" of the latter hydrocarbons into the hydrogen fluoride vapor outlet. Suitable inert liquids into which the hydrogen fluoride sludge may be charged comprise the saturated hydrocarbons such as the paraffins and naphthenes boiling from about 50° to about 180° C., preferably from about 110 to about 140° C. Such hydrocarbons include the octanes, nonanes, decanes, or mixtures thereof, such as a fraction of a straight run gasoline boiling in the above range, diethylcyclohexane, trimethylcyclohexane, etc. Other inert diluents include the haloalkanes such as bromo- or chloroheptane and various inorganic compounds such as salts or mixtures of salts melting below the above desired temperature range of operation and which are chemically stable and unreactive toward hydrogen fluoride. The heat of vaporization of the hydrogen fluoride and the heat of decomposition may be supplied in the decomposition zone by vaporizing the inert diluent from the reboiler section thereby maintaining the inert diluent under reflux and allowing the hydrogen fluoride sludge to come into direct contact with the hot vapors from the reboiling section.

The present process for producing polyolefinic cyclic hydrocarbons of medium diene value by contacting the initial product or conjunct polymers with a quantity of catalyst less than that sufficient to form catalyst-hydrocarbon complexes of all the hydrocarbon molecules in the mixture of conjunct polymers is thus also applicable in principle to the aforesaid method involving thermal decomposition of a hydrogen fluoride sludge.

The following alternative method of operating the present process for the production of medium diene value conjunct polymers is likewise characterized by the fact that the conversion is effected in situ during the initial or primary decomposition of the hydrogen fluoride-conjunct polymer complexes comprising the sludge.

In this method the decomposition vessel consists of a tower, usually packed with copper or brass, with facilities for introducing sludge into the middle portion and naphtha vapors into the bottom, and outlets at the top for vapors (principally HF) and at the bottom for liquid (naphtha plus hydrocarbon product from the sludge). Examples of the manner in which the usual operating methods may be altered to obtain the improved products described in this invention will be briefly described. As a first alternative a portion of the hydrocarbon product recovered by the decomposition of the catalyst complex may be recycled into the decomposition tower feed. The introduction of such recycle stock is effected at such a point that the desired residence time for the mixture is attained before it enters the decomposition tower; and this inlet portion is heated to provide the desired temperature for the polymerization reaction. Flexibility is obtained in such a system by independent control of temperature and the flow rates of the catalyst complex and the recycle hydrocarbon.

Another system which accomplishes the desired result requires two catalyst complex inlets into the decomposition tower. The material entering the higher inlet is partially or completely decomposed in the tower. The hydrocarbon portion traveling down the tower contacts the feed entering by way of the lower inlet where the mixing of unsaturated hydrocarbons and catalyst complex provides the conditions for the desired isomerization reactions. This arrangement does not permit rigorous control of process variables but is extremely simple and easy to operate.

Another variation is the operating procedure of lowering the temperature of the decomposition tower at the point of charge. The tower must then be operated so that the conditions in an appreciable portion of the tower are such as to promote partial but not complete decomposition, the removal of catalyst being finally completed in the last portion of the tower traversed. This method is seldom completely satisfactory because such close control in the decomposition tower is difficult and oftentimes incomplete decomposition results with consequent loss of catalyst and necessity for further product treatment to obtain a useable product.

Yet another method requires the use of a flash tower where a predetermined portion of the catalyst in the sludge complex is removed and the product undergoes isomerization due to the conditions in the tower and the presence of a portion of the catalyst. The product may then be completely decomposed in the usual manner in the decomposition tower.

The mixture of polyolefinic cyclic hydrocarbons or conjunct polymers comprising the product of the present process contains a series of high molecular weight cyclic hydrocarbons of wide boiling range but of generally homologous structure, the cyclic portion of the hydrocarbons having a cyclopentenyl structure and one or more alkenyl or alkapolyenyl side chains. Infra-red and ultra-violet absorption studies, as well as other analytical data determined on the recovered conjunct polymers, have indicated that the individual hydrocarbons are cyclic, although substantially non-aromatic, have isolated unsaturation in addition to a limited number of conjugated olefinic double bonds (determined by the extent of the isomerization herein effected), and the cyclic ring of the hydrocarbon molecules are highly substituted. The hydrocarbons boil from about 150 to over 450° C., have bromine numbers above about 140 to about 200, maleic anhydride values of from about 15 to about 65, the particular value depending upon choice, an average number of olefinic double bonds per molecule of from about 2.5 to about 4 and average molecular weights of from about 250 to about 400, although some components may have molecular weights as high as about 1000. The product dries on exposure to atmospheric oxygen in a thin film to a hard, relatively elastic coating which is impervious to water or aqueous caustic.

EXAMPLE I

A mixture of conjunct hydrocarbon polymers having a high diene value was prepared by the following procedure:

22 liters (16.5 kg.) of non-selective polymer gasoline having a bromine number of about 162, an initial boiling point of 45° C. and an end boiling point of 236° C. was charged into a pressure autoclave and rapidly stirred as 9.0 kg. of liquid anhydrous hydrogen fluoride was introduced into the autoclave. The pressure was maintained throughout the reaction at an average value of about 205 pounds per square inch by means of compressed nitrogen. The temperature was increased to 91° C. and stirring was continued for an additional one hour. The reaction mixture following the above period of reaction and upon standing quiescent for several minutes separated into two phases: An upper saturated hydrocarbon layer and a lower acidic layer. The lower acidic layer was withdrawn and weighed 16.1 kg. after removal of entrained "upper layer" by extracting the acid sludge with liquid pentane. It was a light brown mobile fluid having a density of 0.98 at 4° C.

The above hydrogen fluoride sludge can be decomposed by several alternative procedures for the recovery of a mixture of polyolefinic cyclic hydrocarbons having a high degree of conjugated unsaturation. In accordance with one of these methods, the so-called hydrolytic method of decomposition, the sludge is added to a quantity of water which dissolves the hydrogen fluoride catalyst from the sludge and liberates a mixture of conjunct polymer hydrocarbons which separate from the lower aqueous acid phase. In accordance with this procedure, 1000 grams of the sludge, as prepared above, was allowed to flow into a mixture of ice and water, additional ice being added as the heat of the hydrolytic reaction melted the ice. 434 grams of a light-colored, sweet-smelling oil separated from the aqueous phase. Upon examination the mixture of hydrocarbons had the following physical properties:

| | |
|---|---|
| Boiling range | 160->400° C. |
| Density, $d_4^{20}$ | 0.863 |
| Refractive index $n_D^{20}$ | 1.4871 |
| Molecular weight | 263 |
| Diene number | 85 |
| Bromine number | 195 |
| Double bonds per molecule (average) | 3.2 |

The above mixture of polyolefinic cyclic hydrocarbons having the above indicated diene value of 85 may be modified in accordance with the present invention by heating the oil with a quantity of conjunct polymerization catalyst corresponding to less than 6 mols of catalyst per hydrocarbon double bond:

420 grams of the above hydrocarbon conjunct polymer mixture was admixed with 10.95 grams of anhydrous hydrogen fluoride to provide a mixture containing 2.54% hydrogen fluoride. The mixture was heated at 122° C. for 30 minutes and at a pressure sufficient to maintain the reaction mixture in substantially liquid phase. Following the above period of reaction, the contents of the reactor were cooled and the resulting sludge poured into a mixture of ice and water to hydrolyze the sludge and remove the hydrogen fluoride from the liberated conjunct polymer hydrocarbons. The hydrocarbon product which floated to the top of the aqueous hydrofluoric acid solution and was decanted therefrom had the following properties:

| | |
|---|---|
| Boiling range | 175–>400° C. |
| Density | 0.870 |
| Molecular weight | 300 |
| Diene number | 30 |
| Bromine number | 190 |
| Double bonds per molecule (average) | 3.5 |

The hydrocarbon when spread in a thin film and exposed to atmospheric oxygen dried to a relatively non-brittle film as compared to the brittle, friable film obtained from the polyolefinic cyclic hydrocarbon starting material having an initial diene number of 85.

EXAMPLE II

In a continuous apparatus 1.9 parts by weight of the non-selective polymer used for Example I was reacted with 1 part of hydrogen fluoride at 90° C. with an average residence time of one hour. The products were permitted to settle, and the catalyst phase was withdrawn from the settler and extracted with liquid pentane. Then the catalyst phase was fed to the decomposition tower which was packed with copper rings. Heat was supplied by naphtha vapors entering the bottom of the tower. As decomposition occurred, the hydrogen fluoride vapor was removed overhead and the hydrocarbon diluted with naphtha was withdrawn from the bottom. After stripping to remove the higher diluent naphtha, the diene number of the oil was 65. Then the apparatus was connected so that the hydrocarbons liberated from the sludge might be recycled to the catalyst complex inlet line. The preheater on this line was maintained at 122° C. and the recycle rate was twice the catalyst complex rate. Conditions in the decomposition tower were kept as constant as possible. The hydrocarbon oil recovered from this operation had a diene number of 26 and a bromine number approximately equal to that of the 65 diene number oil. The two oils dried at approximately the same speed, but the lower diene number oil formed a dried film which was less brittle than that formed from the higher diene oil.

EXAMPLE III

The high diene value mixture of conjunct polymers recovered from a hydrogen fluoride sludge by the hydrolytic method of decomposition, as in Example I, may be converted to a mixture of conjunct polymers having an intermediate diene value by contacting the hydrogen fluoride sludge hydrocarbons with a different conjunct polymerization catalyst than the hydrogen fluoride utilized in the initial conversion. In this procedure, the mixture of conjunct polymers recovered from the hydrogen fluoride sludge of Example I and having a diene value of 85 was mixed with sulfuric acid of 95% concentration in a volume ratio of hydrocarbon to acid of 10 to 1 and heated at a temperature of 80° C. for 3.5 minutes to form a sludge-like product. The sludge was cooled and then added to a mixture of ice and water. The sulfuric acid entered the aqueous phase, liberating a hydrocarbon phase which floated to the top of the aqueous solution. The hydrocarbon layer was decanted and had the following properties:

| | |
|---|---|
| Boiling range | 175–>400° C. |
| Bromine number | 185 |
| Molecular weight | 295 |
| Diene number | 40 |
| Double bonds per molecule (average) | 3.4 |

We claim as our invention:

1. A process for improving a hydrocarbon drying oil recovered from a conjunct polymerization sludge as a mixture of polyolefinic cyclic hydrocarbons having diene numbers of at least 80 and containing from about 2.5 to about 4 double bonds per molecule of which an average of from about 1.5 to about 2.5 belong to a conjugated dienic system, which comprises subjecting said drying oil to an isomerization temperature in admixture with an amount of a conjunct polymerization catalyst less than the theoretical quantity required to form catalyst-hydrocarbon complexes, continuing the isomerization treatment of the drying oil at said temperature and with said catalyst until its diene number has been reduced to a value of from about 15 to about 65, and recovering the thus isomerized drying oil of reduced diene number.

2. A process for improving a hydrocarbon drying oil recovered from a conjunct polymerization sludge as a mixture of polyolefinic cyclic hydrocarbons having diene numbers of at least 80 and containing from about 2.5 to about 4 double bonds per molecule of which an average of from about 1.5 to about 2.5 belong to a conjugated dienic system, which comprises subjecting said drying oil to an isomerization temperature in admixture with an amount of hydrogen fluoride catalyst corresponding to less than 6 mols of hydrogen fluoride per double bond of said polyolefinic cyclic hydrocarbons, continuing the isomerization treatment of the drying oil at said temperature and with said catalyst until its diene number has been reduced to a value of from about 15 to about 65, and recovering the thus isomerized drying oil of reduced diene number.

3. The process of claim 1 further characterized in that said catalyst is selected from the group consisting of hydrogen fluoride, aluminum halides and sulfuric acid.

4. The process of claim 1 further characterized in that said catalyst is sulfuric acid in an amount corresponding to less than 3 mols of sulfuric acid per double bond of said polyolefinic cyclic hydrocarbons.

5. The process of claim 1 further characterized in that said catalyst is aluminum chloride in an amount corresponding to less than one mol of aluminum chloride per double bond of said polyolefinic cyclic hydrocarbons.

6. The process of claim 1 further characterized in that said isomerization temperature is within the range of from about 0° C. to about 200° C.

7. A drying oil comprising a mixture of polyolefinic cyclic hydrocarbons boiling between about 150° and 450° C. and having diene numbers of from about 15 to about 65, bromine numbers of from about 140 to about 200, an average number of olefinic double bonds per molecule of from about 2.5 to about 4 and an average molecular weight of from about 250 to about 400.

HERMAN S. BLOCH.
ALFRED E. HOFFMAN.

References Cited in the file of this patent

UNITED STATES PATENTS

| Number | Name | Date |
|---|---|---|
| 2,240,081 | Thomas | Apr. 29, 1941 |
| 2,329,397 | D'Ouville et al. | Sept. 14, 1943 |
| 2,413,310 | Bloch | Dec. 31, 1946 |
| 2,440,459 | Bloch | Apr. 27, 1948 |
| 2,440,477 | Johnstone | Apr. 27, 1948 |
| 2,481,498 | Carnell | Sept. 13, 1949 |
| 2,513,558 | Geiser | July 4, 1950 |
| 2,544,552 | Carnell | Mar. 6, 1951 |
| 2,559,083 | May et al. | July 3, 1951 |